(12) United States Patent
Sumikawa

(10) Patent No.: US 11,781,884 B2
(45) Date of Patent: Oct. 10, 2023

(54) TIRE PROPOSAL SYSTEM

(71) Applicant: TOYOTA JIDOSHA KABUSHIKI KAISHA, Toyota (JP)

(72) Inventor: Takeshi Sumikawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 204 days.

(21) Appl. No.: 17/359,984

(22) Filed: Jun. 28, 2021

(65) Prior Publication Data

US 2022/0042825 A1    Feb. 10, 2022

(30) Foreign Application Priority Data

Aug. 4, 2020   (JP) .................................. 2020-132400

(51) Int. Cl.
*B60C 23/06*    (2006.01)
*G01C 22/02*    (2006.01)

(52) U.S. Cl.
CPC .......... *G01C 22/025* (2013.01); *B60C 23/061* (2013.01); *B60C 23/067* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461;

(Continued)

(56) References Cited

U.S. PATENT DOCUMENTS 11,505,014 B2 * 11/2022 Karlsson ............... B60C 23/062

FOREIGN PATENT DOCUMENTS

CN   111483277 A  *  8/2020
JP   2002-222326 A    8/2002

(Continued)

*Primary Examiner* — Andre J Allen
(74) *Attorney, Agent, or Firm* — Oliff PLC

(57) ABSTRACT

A tire proposal system that proposes a tire of a vehicle to a user includes a processing unit that proposes an appropriate tire that is a tire appropriate for the vehicle based on a mileage and a driving time of each trip of the vehicle. With such processing, the appropriate tire is proposed to the user considering a traveling pattern (usage tendency) of the vehicle, which can be grasped from the mileage and the driving time of the each trip of the vehicle, thereby a tire appropriate for the traveling pattern of the vehicle can be proposed to the user as the appropriate tire.

3 Claims, 3 Drawing Sheets

(58) Field of Classification Search
CPC ............ B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0449; B60C 23/0427; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; G01C 7/04; G01C 9/00; G01C 22/02; G01C 21/005; G01C 21/30; G01C 9/06; G01C 1/02; G01C 1/06; G01C 11/00; G01C 11/06; G01C 15/00; G01C 15/002; G01C 19/14; G01C 21/26; G01C 21/32; G01C 21/3484; G01C 7/00; G01C 9/02; G01C 9/08; G01C 9/10; G01C 9/12; G01C 9/14; G01C 9/18; G01C 21/00; G01C 21/3461; G01C 21/3822; G01C 21/3826
USPC ................................. 73/146–146.8
See application file for complete search history.

(56) References Cited

FOREIGN PATENT DOCUMENTS

| | | | | |
|---|---|---|---|---|
| JP | 2002222361 | A | * | 8/2002 |
| JP | 2003178219 | A | * | 6/2003 |
| JP | 2010277156 | A | * | 12/2010 |
| JP | 5462673 | B2 | * | 4/2014 |
| WO | WO-2023286514 | A1 | * | 1/2023 |

* cited by examiner

TIRE PROPOSAL SYSTEM

CROSS-REFERENCE TO RELATED APPLICATION

This application claims priority to Japanese Patent Application No. 2020-132400 filed on Aug. 4, 2020, incorporated herein by reference in its entirety.

BACKGROUND

1. Technical Field

The present disclosure relates to a tire proposal system.

2. Description of Related Art

As a tire proposal system of this type, there has been proposed a system that selects an optimum tire based on vehicle information provided by a user and tire search conditions (see, for example, Japanese Unexamined Patent Application Publication No. 2002-222326 (JP 2002-222326 A)). Here, the vehicle information includes information such as a vehicle manufacturer name, a vehicle model name, a model year, a grade, and a number.

SUMMARY

In the above-mentioned tire proposal system, a tire is selected without considering the traveling pattern (usage tendency) of the vehicle. Therefore, the system may have been unable to propose to a user a tire appropriate for the traveling pattern of the vehicle.

The main object of the tire proposal system of the present disclosure is to propose to a user a tire appropriate for a traveling pattern of a vehicle.

The tire proposal system of the present disclosure has adopted the following means in order to achieve the above-mentioned main object.

The tire proposal system of the present disclosure is a tire proposal system that proposes a tire of a vehicle to a user, and includes a processing unit that proposes an appropriate tire that is a tire appropriate for the vehicle based on a mileage and a driving time of each trip of the vehicle.

The tire proposal system of the present disclosure proposes an appropriate tire that is a tire appropriate for a vehicle based on the mileage and driving time of each trip of the vehicle. With such processing, it is possible to propose to the user a tire appropriate for the traveling pattern (usage tendency) of the vehicle, which can be grasped from the mileage and the driving time of each trip of the vehicle, as the appropriate tire.

In the tire proposal system of the present disclosure, the processing unit may calculate an average vehicle speed of the each trip of the vehicle by dividing the mileage of the each trip of the vehicle by the driving time, and propose the appropriate tire based on the calculated average vehicle speed of the each trip of the vehicle. In this case, the processing unit may propose the appropriate tire based on a ratio of the number of trips in which the average vehicle speed is equal to or lower than a predetermined vehicle speed to the total number of trips of the vehicle. In this case, when the ratio is equal to or higher than a predetermined ratio, the processing unit may propose a tire that prioritizes fuel efficiency and riding quality over high speed traveling stability as the appropriate tire, and when the ratio is lower than the predetermined ratio, the processing unit may propose a tire that prioritizes the high speed traveling stability over the fuel efficiency and the riding quality as the appropriate tire. In this way, it is possible to propose to the user a tire further appropriate for the traveling pattern (usage tendency) of the vehicle, which can be grasped from the mileage and the driving time of each trip of the vehicle, as the appropriate tire.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to embodiments.

Figure 1:
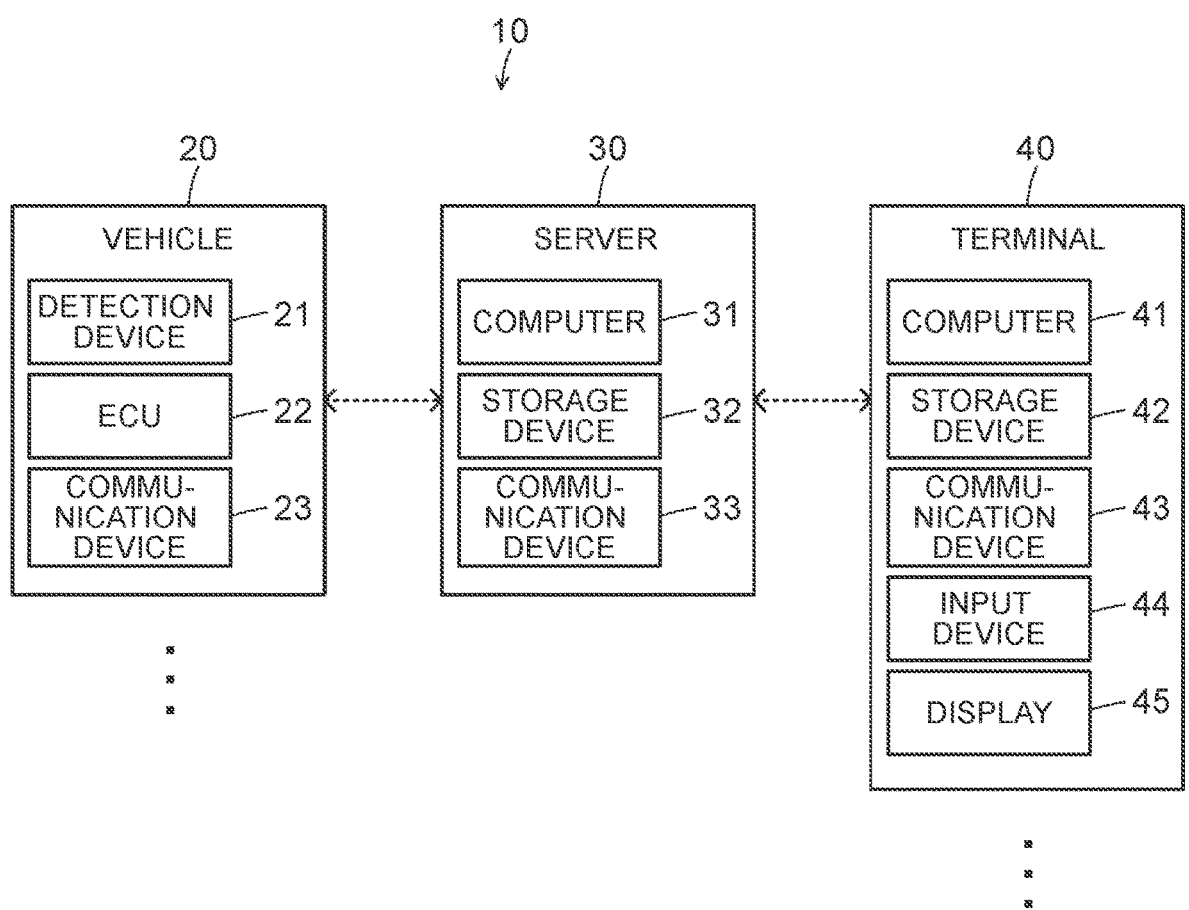
FIG. 1 is a configuration diagram showing an outline of a configuration of a tire proposal system 10.

FIG. 1 is a configuration diagram showing an outline of a configuration of a tire proposal system 10 as an embodiment of the present disclosure. As shown in the figure, the tire proposal system 10 of the embodiment includes each vehicle 20, a server 30 that communicates with each vehicle 20, and each terminal 40 that is installed in a vehicle dealer, a tire dealer, or the like, and that communicates with the server 30.

Each vehicle 20 is configured as a vehicle such as a two-wheeled vehicle or a four-wheeled vehicle that travels using power from a drive source such as an engine or a motor, and has a detection device 21 for detecting vehicle information about the vehicle, an electronic control unit (hereinafter referred to as "ECU") 22, and a communication device 23. The detection device 21 is composed of various sensors and the like. Examples of the information detected by the detection device 21 include average vehicle speed, wheel speed, front-rear acceleration, lateral acceleration, and the like. Examples thereof also include the steering angle of the steering wheel, the amount of depression of the accelerator pedal, the amount of depression of the brake pedal, the shift position of the shift lever, and the like. The ECU 22 is equipped with a microcomputer having a central processing unit (CPU), a read only memory (ROM), a random access memory (RAM), a flash memory, an input/output port, a communication port, and the like, and performs various calculations and controls the drive source based on the vehicle information detected by the detection device 21. The communication device 23 communicates between the ECU 22 and the outside (server 30 in the embodiment).

The server 30 includes a computer 31, a storage device 32, and a communication device 33. The computer 31 is configured as a well-known computer having a CPU, a ROM, a RAM, a flash memory, an input/output port, a communication port, and the like, and is electrically connected to the storage device 32 and the communication device 33. The storage device 32 is configured as, for example, a hard disk, a solid state drive (SSD), or the like. The storage device 32 stores vehicle information and the like from each vehicle 20. The vehicle information includes, for example, information of the identification number of the vehicle 20 associated with the mileage L [i] and the driving time T [i] of each trip i (i=1, . . . , Nt) of the vehicle 20 in a predetermined period (about several months to one year). The value Nt is the total number of trips of the vehicle 20 in the predetermined period (the number of sets of the mileage L [i] and the driving time T [i]). The communication device 33 communicates between the computer 31 and the outside (in the embodiment, each vehicle 20 and each terminal 40).

Each terminal 40 is configured as a desktop personal computer, a laptop personal computer, a tablet terminal, or the like, and includes a computer 41, a storage device 42, a communication device 43, an input device 44, and a display 45. The computer 41 is configured as a well-known computer having a CPU, a ROM, a RAM, a flash memory, an input/output port, a communication port, and the like, and is electrically connected to the storage device 42, the communication device 43, the input device 44, and the display 45. The storage device 42 is configured as a hard disk, a SSD, or the like. The communication device 43 communicates between the computer 41 and the outside (server 30 in the embodiment). Examples of the input device 44 include a mouse, a keyboard, and a touch panel. The display 45 displays various types of information.

Figure 2:
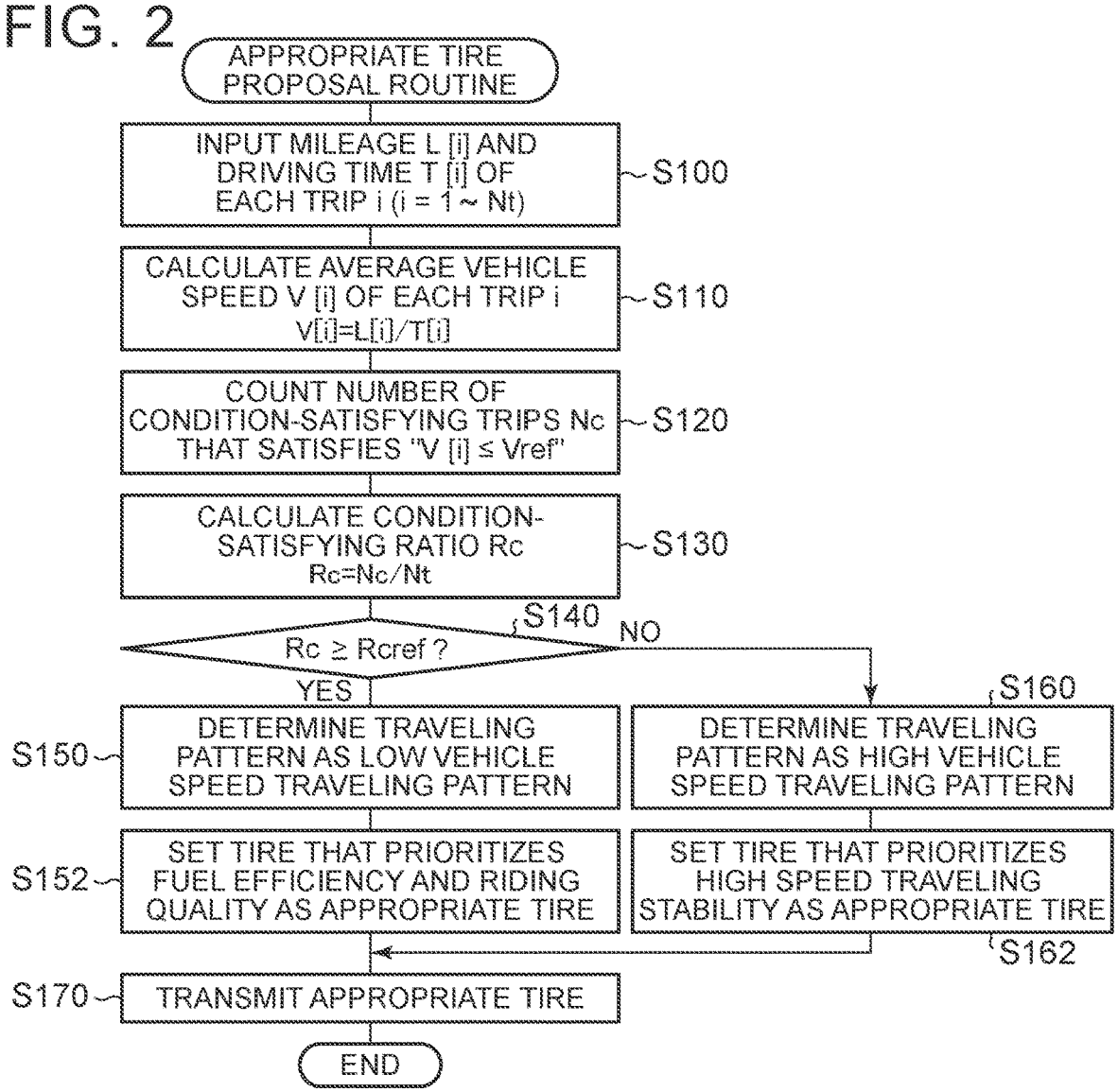
FIG. 2 is a flowchart showing an example of an appropriate tire proposal routine executed by a computer 31 of a server 30.

Next, the following describes the operation of the tire proposal system 10 of the embodiment configured in this way, particularly the operation of the server 30 and the terminal 40 when a salesperson or the like at a vehicle dealer or a tire dealer proposes to a user a tire (hereinafter referred to as "appropriate tire") appropriate for the user's vehicle 20 (hereinafter referred to as "user vehicle"). FIG. 2 is a flowchart showing an example of an appropriate tire proposal routine executed by the computer 31 of the server 30. This routine is executed when, for example, a salesperson or the like operates the input device 44 of the terminal 40 and the server 30 receives a request for proposal of an appropriate tire from the terminal 40. At this time, as search conditions, it is possible to set the vehicle type (sedan, minivan, sport utility vehicle (SUV), etc.) of the user vehicle (vehicle to which the tire is attached), the tire manufacturer name, the tire width, the tire diameter, the purchase budget, and the like.

When the appropriate tire proposal routine in FIG. 2 is executed, the computer 31 of the server 30 first inputs the mileage L [i] and the driving time T [i] of each trip i (i=1, . . . , Nt) of the user vehicle in a predetermined period (step S100). Subsequently, the mileage L [i] is divided by the driving time T [i] of each trip i of the user vehicle in the predetermined period to calculate the average vehicle speed V [i] of each trip i of the user vehicle in the predetermined period (step S110).

Then, the number of condition-satisfying trips Nc, which is the number of trips satisfying the "condition that the average vehicle speed V [i] is equal to or lower than a threshold value Vref" among the trips i of the user vehicle in the predetermined period, is counted (step S120). Here, the threshold value Vref is a threshold value used to determine whether each trip i is a low vehicle speed trip in which the vehicle travels at a relatively low vehicle speed such as in a traffic jam or in an urban area, and a high vehicle speed trip in which the vehicle travels at a relatively high vehicle speed such as in a suburban area or on a highway, and is, for example, 20 km/h to 40 km/h.

Further, a condition-satisfying ratio Rc, which is the ratio of the number of condition-satisfying trips Nc to the total number of trips Nt, is calculated (step S130), and the calculated condition-satisfying ratio Rc is compared with a threshold value Rcref (step S140). Here, the threshold value Rcref is a threshold value used for determining whether the driving pattern of the user vehicle is a low vehicle speed traveling pattern having relatively many low vehicle speed trips or a high vehicle speed traveling pattern having relatively many high vehicle speed trips, and is, for example, 0.5.

When the condition-satisfying ratio Rc is equal to or higher than the threshold Rcref in step S140, it is determined that the traveling pattern of the user vehicle is a low vehicle speed traveling pattern (step S150), a tire appropriate for the low vehicle speed traveling pattern, which is, in the embodiment, a tire that prioritizes fuel efficiency and riding quality over high speed traveling stability, is set as the appropriate tire among the tires that match the search conditions (step S152), and information on the appropriate tire is transmitted to the terminal 40 (step S170), thereby ending the routine.

When the condition-satisfying ratio Rc is lower than the threshold Rcref in step S140, it is determined that the traveling pattern of the user vehicle is a high vehicle speed traveling pattern (step S160), a tire appropriate for the high vehicle speed traveling pattern, which is, in the embodiment, a tire that prioritizes high speed traveling stability over fuel efficiency and riding quality, is set as the appropriate tire among the tires that match the search conditions (step S162), and information on the appropriate tire is transmitted to the terminal 40 (step S170), thereby ending the routine.

When the computer 41 of the terminal 40 receives the information on the appropriate tire from the server 30, the computer 41 causes the display 45 to display the information. In this way, it is possible to propose to the user a tire appropriate for the traveling pattern (usage tendency) of the user vehicle, which can be grasped from the mileage L [i] and the driving time T [i] of each trip i of the user vehicle.

FIGS. 3 to 6 are explanatory diagrams showing examples of the mileage L [i] and the driving time T [i] of each trip i of the vehicle 20 in a predetermined period (for example, about several months). In FIGS. 3 to 6, "L1", "L2", "L3", and "L4" are lines having average vehicle speeds V of values V1, V2, V3, and V4, respectively. The value V1 is, for example, about 5 km/h to 15 km/h. The value V2 is, for example, a line in which the average vehicle speed is about 15 km/h to 25 km/h higher than the value V1. The value V3 is, for example, a line in which the average vehicle speed is about 15 km/h to 25 km/h higher than the value V2. The value V4 is, for example, a line in which the average vehicle speed is about 15 km/h to 25 km/h higher than the value V3.

Figure 3:
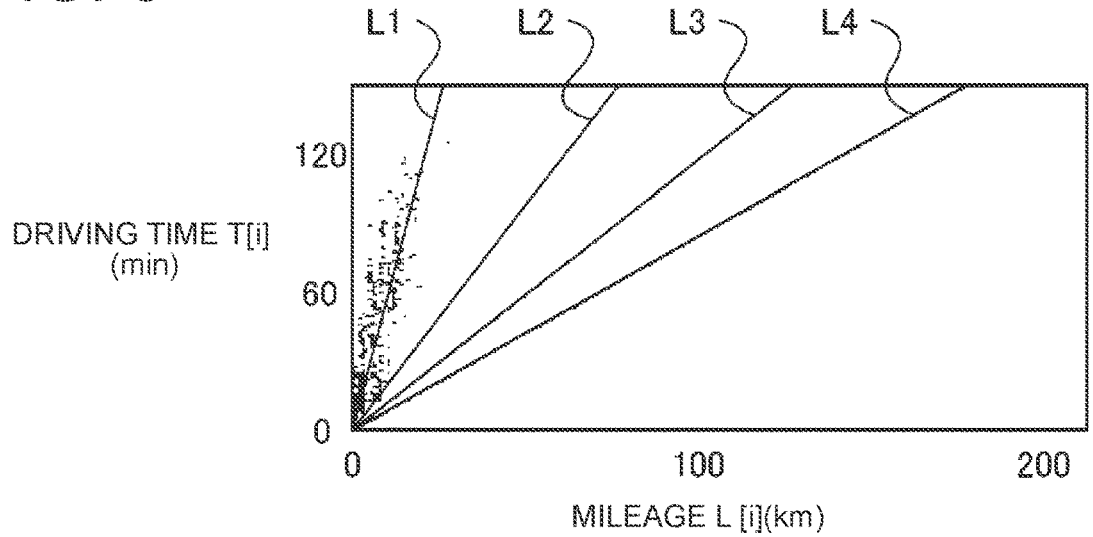
FIG. 3 is an explanatory diagram showing an example of a mileage L [i] and a driving time T [i] of each trip i of a vehicle 20 in a predetermined period.
Figure 4:
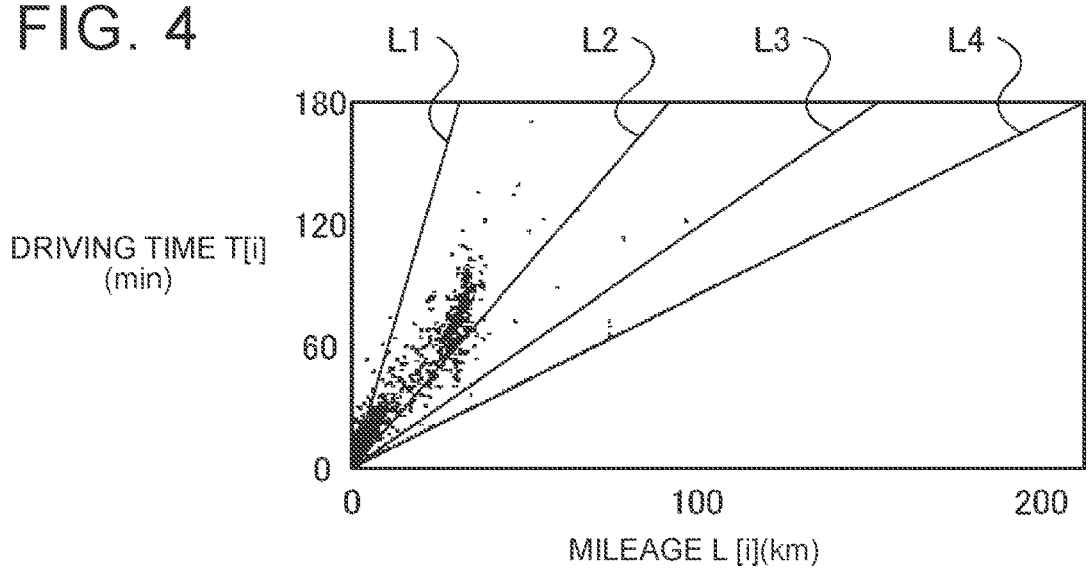
FIG. 4 is an explanatory diagram showing an example of a mileage L [i] and a driving time T [i] of each trip i of the vehicle 20 in a predetermined period.
Figure 5:
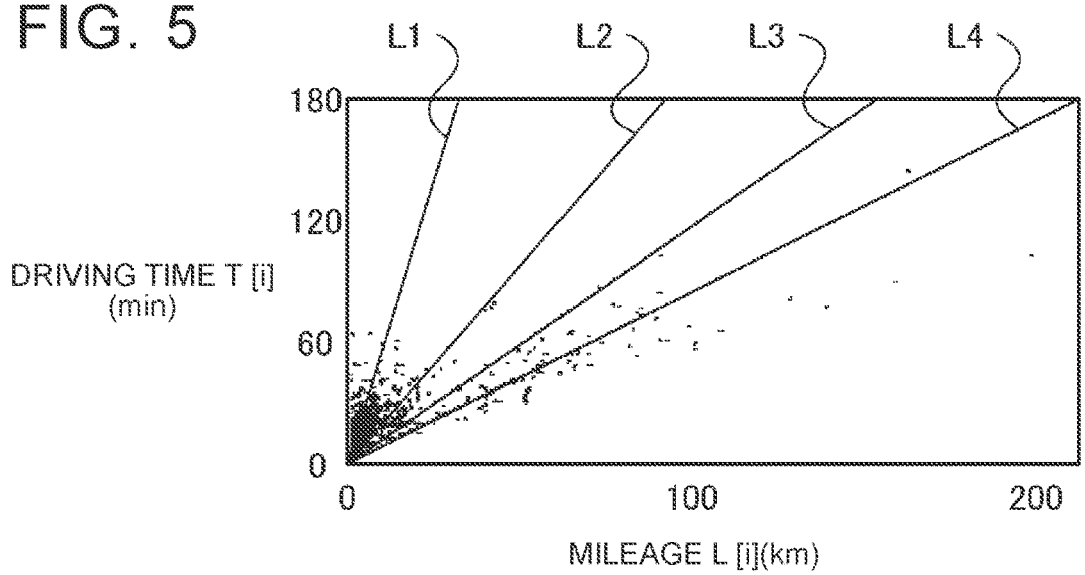
FIG. 5 is an explanatory diagram showing an example of a mileage L [i] and a driving time T [i] of each trip i of the vehicle 20 in a predetermined period.
Figure 6:
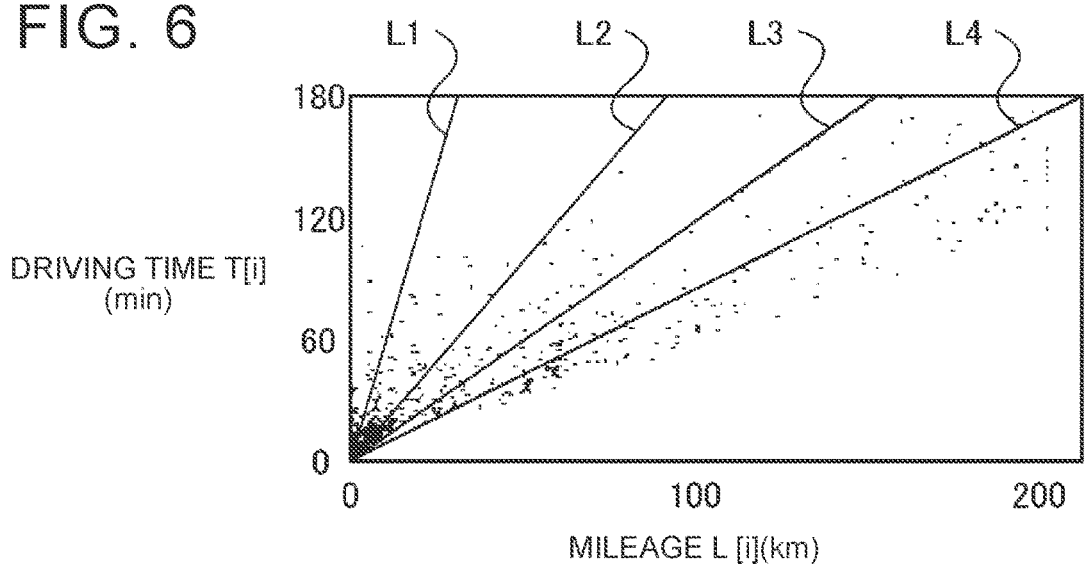
FIG. 6 is an explanatory diagram showing an example of a mileage L [i] and a driving time T [i] of each trip i of the vehicle 20 in a predetermined period.

FIG. 3 shows a traveling pattern in which traveling in a congested environment is relatively frequent. FIG. 4 shows a traveling pattern in which traveling in an urban area is relatively frequent. FIG. 5 shows a traveling pattern in which the vehicle travels at a relatively high frequency such as commuting and leisure, and traveling in the suburbs or on highways is relatively frequent. FIG. 6 shows a traveling pattern in which the vehicle travels at a relatively high frequency as in FIG. 5, but traveling in the suburbs or on highways is more frequent and the mileage and the driving time per trip are longer than in FIG. 5. Here, consider the case where the value V2 is used as the above-mentioned threshold value Vref. At this time, when the traveling pattern of the user vehicle is a traveling pattern as shown in FIGS. 3 and 4, a tire appropriate for a low vehicle speed traveling pattern, which is, in the embodiment, a tire that prioritizes fuel efficiency and riding quality, is proposed to the user as the appropriate tire. On the other hand, when the traveling pattern of the user vehicle is a traveling pattern as shown in FIGS. 5 and 6, a tire appropriate for a high vehicle speed traveling pattern, which is, in the embodiment, a tire that prioritizes high speed traveling stability, is proposed to the user as the appropriate tire. In this way, it is possible to propose to the user a tire appropriate for the traveling pattern (usage tendency) of the user vehicle, which can be grasped from the mileage L [i] and the driving time T [i] of each trip i of the user vehicle.

In the tire proposal system 10 of the embodiment described above, the average vehicle speed V [i] of each trip i of the user vehicle is calculated based on the mileage L [i] and the driving time T [i] of each trip i of the user vehicle, and an appropriate tire is proposed to the user based on the calculated average vehicle speed V [i] of each trip i of the user vehicle. Therefore, it is possible to propose to the user a tire appropriate for the traveling pattern (usage tendency) of the user vehicle, which can be grasped from the mileage L [i] and the driving time T [i] of each trip i of the user vehicle.

In the tire proposal system 10 of the embodiment, the average vehicle speed V [i] of each trip i is calculated based on the mileage L [i] and the driving time T [i] of each trip i of the user vehicle, the number of condition-satisfying trips Nc is counted based on the calculated average vehicle speed V [i] of each trip i, and the traveling pattern is determined based on the condition-satisfying ratio Rc of the number of condition-satisfying trips Nc to the total number of trips Nt, thereby a tire appropriate for the traveling pattern is proposed as the appropriate tire. However, the present disclosure is not limited to the embodiment described above. For example, the average value ((V [1]+ . . . +V [Nt])/Nt) of the average vehicle speed V [i] of each trip i of the user vehicle or the median value (value at Vt/2 when V [1], . . . , V [Nt] is arranged in descending order) may be obtained as the processed vehicle speed Va, the traveling pattern may be determined based on the processed vehicle speed Va, and a tire appropriate for the traveling pattern may be proposed as the appropriate tire. Further, the data of the set of the mileage L [i] and the driving time T [i] of each trip i of the user vehicle may be plotted on a map with the mileage on the horizontal axis and the driving time on the vertical axis, an approximate straight line may be set by the least squares method using plotted points, the traveling pattern may be determined based on the inclination of the approximate straight line, and a tire appropriate for the traveling pattern may be proposed as the appropriate tire.

In the tire proposal system 10 of the embodiment, the traveling pattern of the user vehicle is determined from two patterns, a low vehicle speed traveling pattern and a high vehicle speed traveling pattern, and a tire appropriate for the traveling pattern is proposed as the appropriate tire. In other words, the appropriate tire is proposed from two options, a tire appropriate for a low vehicle speed traveling pattern and a tire appropriate for a high vehicle speed traveling pattern. However, the traveling pattern may be determined from three or more traveling patterns, and a tire appropriate for the traveling pattern may be proposed as the appropriate tire.

For example, in the embodiment, with respect to FIGS. 3 to 6, the appropriate tire is changed depending on whether the traveling pattern is as shown in FIG. 3 or 4 or the traveling pattern is as shown in FIG. 5 or 6. However, the appropriate tire may be changed for the traveling pattern as shown in FIG. 3, the traveling pattern as shown in FIG. 4, the traveling pattern as shown in FIG. 5, and the traveling pattern as shown in FIG. 6.

In the tire proposal system 10 of the embodiment, the computer 31 of the server 30 sets an appropriate tire by executing the appropriate tire proposal routine in FIG. 2 and transmits information on the appropriate tire to the terminal 40, and the computer 41 of the terminal 40 causes the display 45 to display the information on the appropriate tire received from the server 30. However, the computer 41 of the terminal 40 may receive the mileage L [i] and the driving time T [i] of each trip i of the user vehicle from the vehicle 20 and/or the server 30, execute the appropriate tire proposal routine in FIG. 2 to set the appropriate tire, and cause the display 45 to display the information on the appropriate tire.

As for the correspondence between the main elements of the embodiments and the main elements of the disclosure described in SUMMARY, since the embodiments are examples for specifically describing a mode for carrying out the disclosure described in SUMMARY, the embodiments do not limit the elements of the disclosure described in SUMMARY. In other words, the interpretation of the disclosure described in SUMMARY should be performed based on the description in SUMMARY, and the embodiments are merely specific examples of the disclosure described in SUMMARY.

Although modes for carrying out the present disclosure have been described above with reference to the embodiments, the present disclosure is not limited to these embodiments, and it goes without saying that the present disclosure can be carried out in various modes without departing from the gist of the present disclosure.

The present disclosure can be used in the manufacturing industry of a tire proposal system and the like.

What is claimed is:

1. A tire proposal system that proposes a tire of a vehicle to a user, the tire proposal system comprising a processing unit that proposes an appropriate tire that is a tire appropriate for the vehicle based on a mileage and a driving time of each of trips of the vehicle, wherein
the processing unit calculates an average vehicle speed of each of the trips of the vehicle by dividing the mileage of each of the trips of the vehicle by the driving time, and proposes the appropriate tire based on the calculated average vehicle speed of each of the trips of the vehicle.

2. The tire proposal system according to claim 1, wherein the processing unit proposes the appropriate tire based on a ratio of the number of trips in which the average vehicle speed is equal to or lower than a predetermined vehicle speed to the total number of trips of the vehicle.

3. The tire proposal system according to claim 2, wherein when the ratio is equal to or higher than a predetermined ratio, the processing unit proposes a tire that prioritizes fuel efficiency and riding quality over high speed traveling stability as the appropriate tire, and when the ratio is lower than the predetermined ratio, the processing unit proposes a tire that prioritizes the high speed traveling stability over the fuel efficiency and the riding quality as the appropriate tire.

* * * * *